(12) United States Patent
Jang et al.

(10) Patent No.: US 10,538,173 B2
(45) Date of Patent: Jan. 21, 2020

(54) VEHICLE BATTERY CHARGING CONTROL SYSTEM

(71) Applicants: HYUNDAI MOTOR COMPANY, Seoul (KR); KIA MOTORS CORPORATION, Seoul (KR)

(72) Inventors: Hui Sung Jang, Suwon-si (KR); Gi Bong Son, Hwaseong-si (KR); Hyun Wook Seong, Hwaseong-si (KR)

(73) Assignees: HYUNDAI MOTOR COMPANY, Seoul (KR); KIA MOTORS CORPORATION, Seoul (KR)

( * ) Notice: Subject to any disclaimer, the term of this patent is extended or adjusted under 35 U.S.C. 154(b) by 79 days.

(21) Appl. No.: 15/802,214

(22) Filed: Nov. 2, 2017

(65) Prior Publication Data

US 2018/0334044 A1   Nov. 22, 2018

(30) Foreign Application Priority Data

May 19, 2017   (KR) .......................... 10-2017-0062312

(51) Int. Cl.
| | |
|---|---|
| B60L 53/20 | (2019.01) |
| H02J 7/02 | (2016.01) |
| H02M 1/44 | (2007.01) |
| H02M 1/42 | (2007.01) |
| H02M 3/335 | (2006.01) |

(52) U.S. Cl.
CPC .............. *B60L 53/20* (2019.02); *H02J 7/022* (2013.01); *H02M 1/4208* (2013.01); *H02M 1/44* (2013.01); *B60L 2210/10* (2013.01); *B60L 2210/30* (2013.01); *H02M 3/33592* (2013.01)

(58) Field of Classification Search
USPC ........................................................ 320/109
See application file for complete search history.

(56) References Cited

U.S. PATENT DOCUMENTS

2014/0028256 A1*   1/2014   Sugiyama ............... B60L 1/006
                                                                         320/109

FOREIGN PATENT DOCUMENTS

| JP | H08154311 A | 6/1996 |
|---|---|---|
| JP | 5610066 B2 | 9/2014 |
| KR | 10-2016-0038348 A | 4/2016 |
| KR | 10-2017-0006568 A | 1/2017 |

* cited by examiner

*Primary Examiner* — Edward Tso
*Assistant Examiner* — Ahmed H Omar
(74) *Attorney, Agent, or Firm* — Morgan, Lewis & Bockius LLP

(57) ABSTRACT

Disclosed herein is a vehicle battery charging control system, which is capable of increasing efficiency of power delivered to an electric device and a low-voltage battery to improve fuel efficiency, by connecting a low-voltage DC-DC converter (LDC) to an AC power source instead of a high-voltage battery upon charging a low-voltage battery of a vehicle to prevent power delivery efficiency of an on-board battery charger (OBC) from being reduced.

10 Claims, 10 Drawing Sheets

VEHICLE BATTERY CHARGING CONTROL SYSTEM

CROSS REFERENCE TO RELATED APPLICATION

The present application claims priority of Korean Patent Application No. 10-2017-0062312 filed on May 19, 2017, the entire contents of which is incorporated herein for all purposes by this reference.

BACKGROUND

Field of the Invention

The present invention relates to a vehicle battery charging control system, and, more particularly, to a vehicle battery charging control system, which is capable of increasing efficiency of power delivered to an electric device and a low-voltage battery to improve fuel efficiency, by connecting a low-voltage DC-DC converter (LDC) to an AC power source instead of a high-voltage battery upon charging a low-voltage battery of a vehicle to prevent power delivery efficiency of an on-board battery charger (OBC) from being reduced.

Description of the Related Art

Ecofriendly vehicles include hybrid vehicles, plug-in hybrid vehicles, electric vehicles, fuel vehicles, etc. Each of the plug-in hybrid vehicle and the electric vehicle is charged by a user using a home power source and has an on-board battery charger (OBC) mounted therein.

When the plug-in hybrid vehicle or the electric vehicle travels, an inverter is located between a high-voltage battery and a motor to charge and discharge the high-voltage battery through driving and regeneration of the motor. A low-voltage DC-DC converter (LDC) is located between the high-voltage battery and a low-voltage battery to charge the low-voltage battery or to supply a load to an electric device.

Upon charging through an OBC using an AC voltage, the high-voltage battery is charged with the AC voltage through the OBC and the LDC is located between the output of the OBC and the high-voltage battery to charge the low-voltage battery and to supply a load to the electric device. At this time, the LDC continuously operates during slow charging to deliver power to the electric device (various controllers, a cooling device, etc.) and the low-voltage battery.

In the related art, efficiency of power delivered to the electric device and the low-voltage battery is low (efficiency of power delivered to the electric device and the low-voltage battery may be a product of OBC power delivery efficiency and LDC power delivery efficiency).

Accordingly, there is a need for a solution for increasing efficiency of power delivered to an electric device and a low-voltage battery to increase fuel efficiency.

The matters disclosed in this section are merely for enhancement of understanding of the general background of the invention and should not be taken as an acknowledgment or any form of suggestion that the matters form the related art already known to a person skilled in the art.

SUMMARY

The present invention provides a vehicle battery charging control system, which is capable of increasing efficiency of power delivered to an electric device and a low-voltage battery to improve fuel efficiency, by connecting a low-voltage DC-DC converter (LDC) to an AC power source instead of a high-voltage battery upon charging a low-voltage battery of a vehicle to prevent power delivery efficiency of an on-board battery charger (OBC) from being reduced.

In accordance with the present invention, the above and other objects may be accomplished by a vehicle battery charging control system including a first charging circuit configured to convert an alternating current (AC) voltage received from an external AC power source into a direct current (DC) voltage and to output the DC voltage, a high-voltage battery configured to receive the DC voltage output from the first charging circuit and to store energy delivered from the first charging circuit, a second charging circuit configured to convert the AC voltage received from the external AC power source into a DC voltage and to output the DC voltage and including a DC-DC conversion circuit configured to output the DC voltage, a low-voltage battery configured to receive the DC voltage output from the second charging circuit and to store energy delivered from the second charging circuit, a first switching unit connected between the high-voltage battery and an input terminal of the DC-DC conversion circuit of the second charging circuit, and a controller configured to control a state of the first switching unit depending on whether a vehicle travels or whether the vehicle is charged.

The controller may close the first switching unit when the vehicle travels.

The controller may open the first switching unit when the vehicle is charged.

The vehicle battery charging control system may further include a second switching unit connected between the external AC power source and the second charging circuit, and the controller may close the first switching unit and open the second switching unit when the vehicle travels.

The controller may open the first switching unit and close the second switches when the vehicle is charged.

The second charging circuit may further include a power factor corrector (PFC) configured to convert the AC voltage received from the external AC power source into a DC voltage and to output the DC voltage and including a rectifier and a boost converter, and the DC-DC conversion circuit of the second charging circuit may drop the DC voltage output from the PFC and output a DC voltage, one side of the first switching unit may be connected to the high-voltage battery and the other side thereof may be connected to an input terminal of the boost converter of the PFC.

In accordance with an aspect of the present invention, the above and other objects may be accomplished by a vehicle battery charging control system including a first charging circuit including a filter configured to eliminate noise of an external alternating current (AC) power source, a power factor corrector (PFC) configured to convert an AC voltage received from the external AC power source into a direct current (DC) voltage and to output the DC voltage, a relay connected between the filter and the PFC, and a DC-DC conversion circuit configured to boost the DC voltage output from the PFC and to output a DC voltage, a high-voltage battery configured to receive the DC voltage output from the first charging circuit and to store energy delivered from the first charging circuit, a second charging circuit configured to convert the AC voltage received from the external AC power source into a DC voltage and to output the DC voltage, including a DC-DC conversion circuit configured to output a DC voltage, and connected to the first charging circuit and the high-voltage battery, a low-voltage battery configured to receive the DC voltage output from the second charging circuit and to store energy delivered from the second charging circuit, a first switching unit connected between the high-voltage battery and an input terminal of the DC-DC conversion circuit of the second charging circuit, and a controller configured to close the first switching unit when a vehicle travels and to open the first switching unit when the vehicle is charged.

The second charging circuit may include a power factor corrector (PFC) configured to convert the AC voltage received from the external AC power source into a DC voltage and to output the DC voltage, and the DC-DC conversion circuit of the second charging circuit may drop the DC voltage output from the PFC of the second charging circuit and output a DC voltage, and an input terminal of the second charging circuit may be connected between the filter and the relay of the first charging circuit.

The second charging circuit may include a power factor corrector (PFC) configured to convert the AC voltage received from the external AC power source into a DC voltage and to output the DC voltage, and the DC-DC conversion circuit of the second charging circuit may drop the DC voltage output from the PFC of the second charging circuit and output a DC voltage, and an input terminal of the second charging circuit may be connected between the relay of the first charging circuit and an input terminal of the PFC.

The PFC of the first charging circuit may include a rectifier and a boost converter, and an input terminal of the second charging circuit may be connected between the rectifier of the first charging circuit and an input terminal of the boost converter.

The second charging circuit may further include a power factor corrector (PFC) configured to convert the AC voltage received from the external AC power source into a DC voltage and to output the DC voltage and including a rectifier and a boost converter, and the DC-DC conversion circuit of the second charging circuit may drop the DC voltage output from the PFC of the second charging circuit and output a DC voltage, one side of the first switching unit may be connected to the high-voltage battery and the other side thereof may be connected to an input terminal of the boost converter of the PFC of the second charging circuit.

The vehicle battery charging control system may further include a second switching unit connected between the first charging circuit and an input terminal of the second charging circuit, and the controller may close the first switching unit and open the second switching unit when the vehicle travels and open the first switching unit and close the second switching unit when the vehicle is charged.

The vehicle charging control systems of the present invention may not connect the LDC to the high-voltage battery but may connect the LDC to the AC power source to prevent power delivery efficiency of the OBC from being reduced. Therefore, it is possible to increase efficiency of power delivered to the electric device and the low-voltage battery to improve fuel efficiency.

In addition, even when the same input power is required, power delivery efficiency may increase upon slow charging, thereby shortening a charging time and reducing electricity costs.

BRIEF DESCRIPTION OF THE DRAWINGS

The above and other objects, features and other advantages of the present invention will be more clearly understood from the following detailed description taken in conjunction with the accompanying drawings, in which.

DETAILED DESCRIPTION

Hereinafter, vehicle battery charging control systems according to various embodiments of the present invention will be described in detail with reference to the accompanying drawings.

Figure 1:
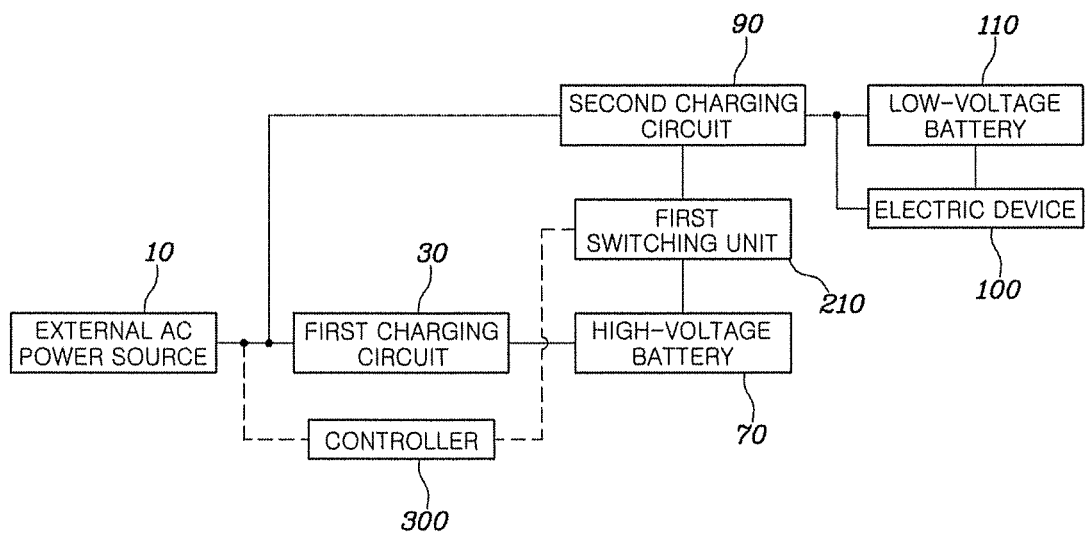
FIG. 1 is a diagram showing the configuration of a vehicle battery charging control system according to an embodiment of the present invention.
Figure 2:
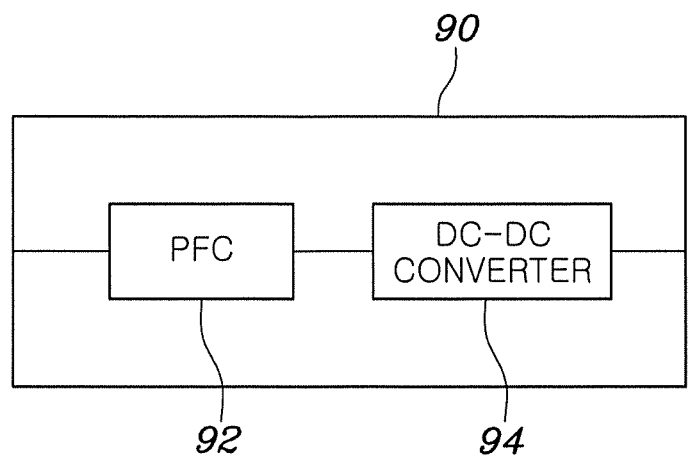
FIG. 2 is a diagram showing the configuration of a second charging circuit of a vehicle battery charging control system according to an embodiment of the present invention.
Figure 3:
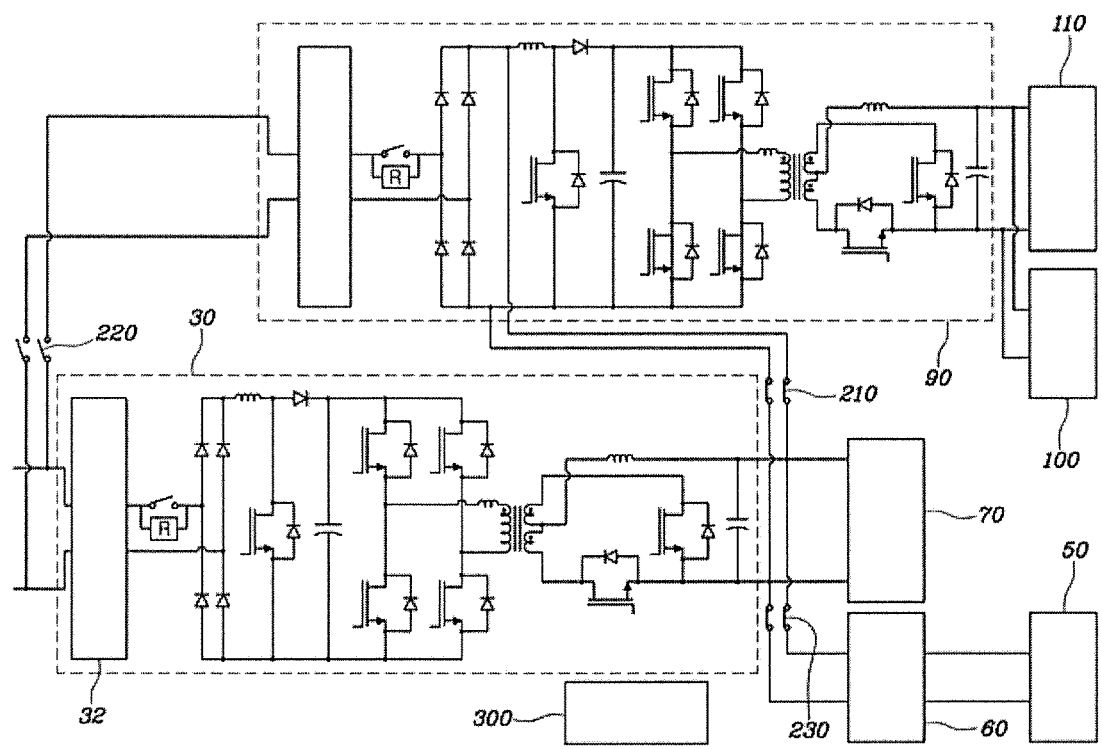
FIGS. 3 and 4 are circuit diagrams showing a vehicle battery charging control system according to an embodiment of the present invention.
Figure 4:
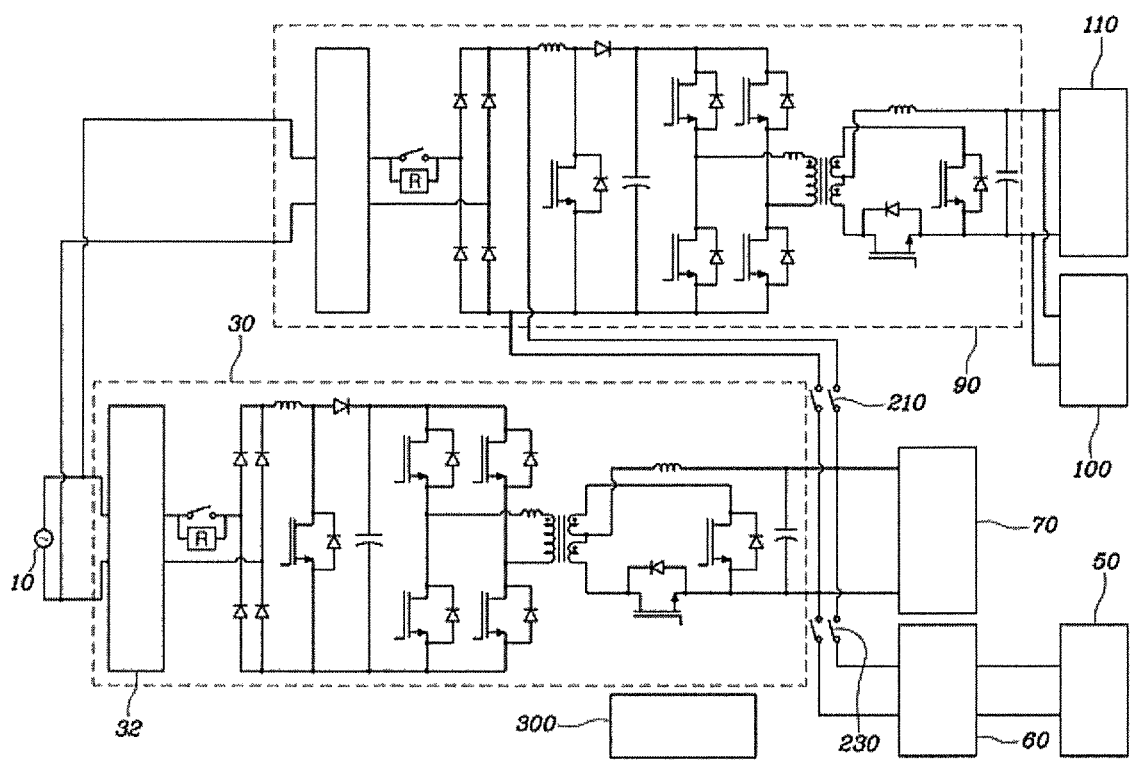
Figure 5:
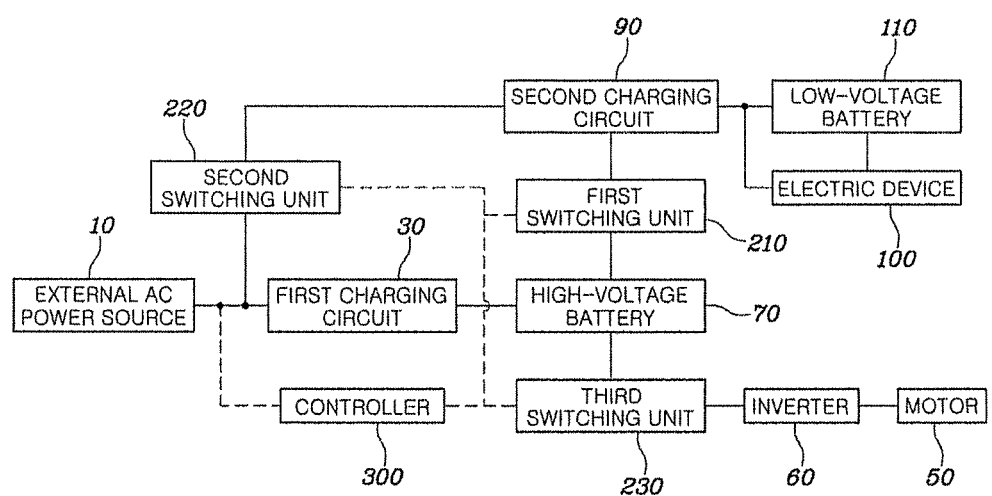
FIG. 5 is a diagram showing the configuration of a vehicle battery charging control system further including a second switching unit according to an embodiment of the present invention.
Figure 6:
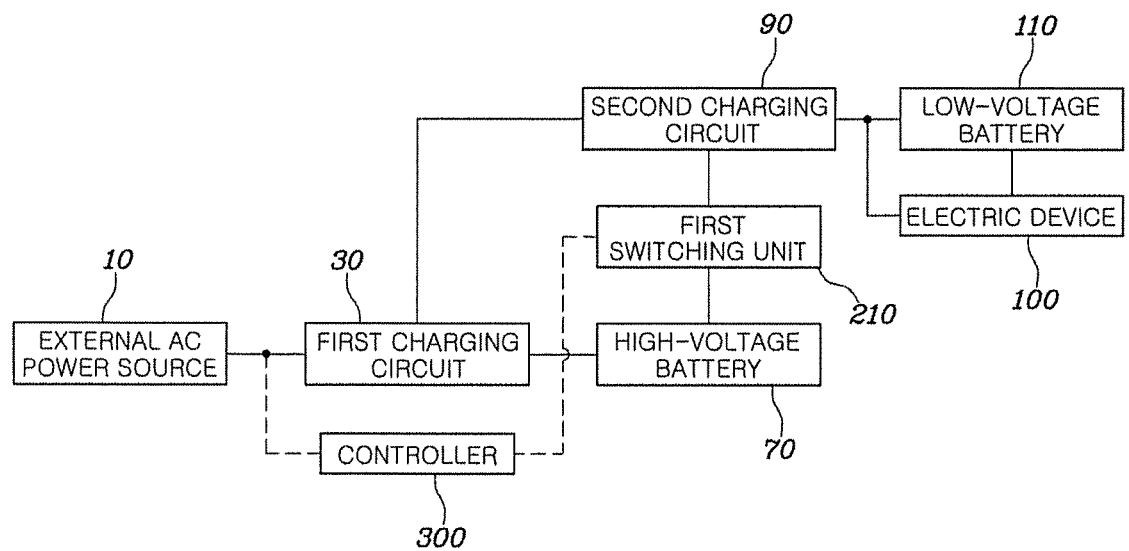
FIG. 6 is a diagram showing the configuration of a vehicle battery charging control system, in which a second charging circuit is connected to a first charging circuit, according to an embodiment of the present invention.
Figure 7:
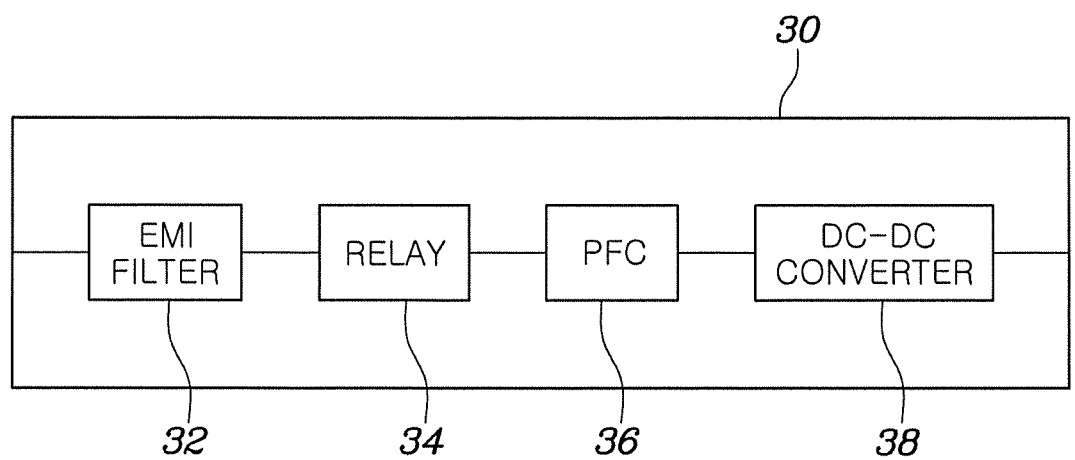
FIG. 7 is a diagram showing the configuration of a first charging circuit of a vehicle battery charging control system according to an embodiment of the present invention.
Figure 8:
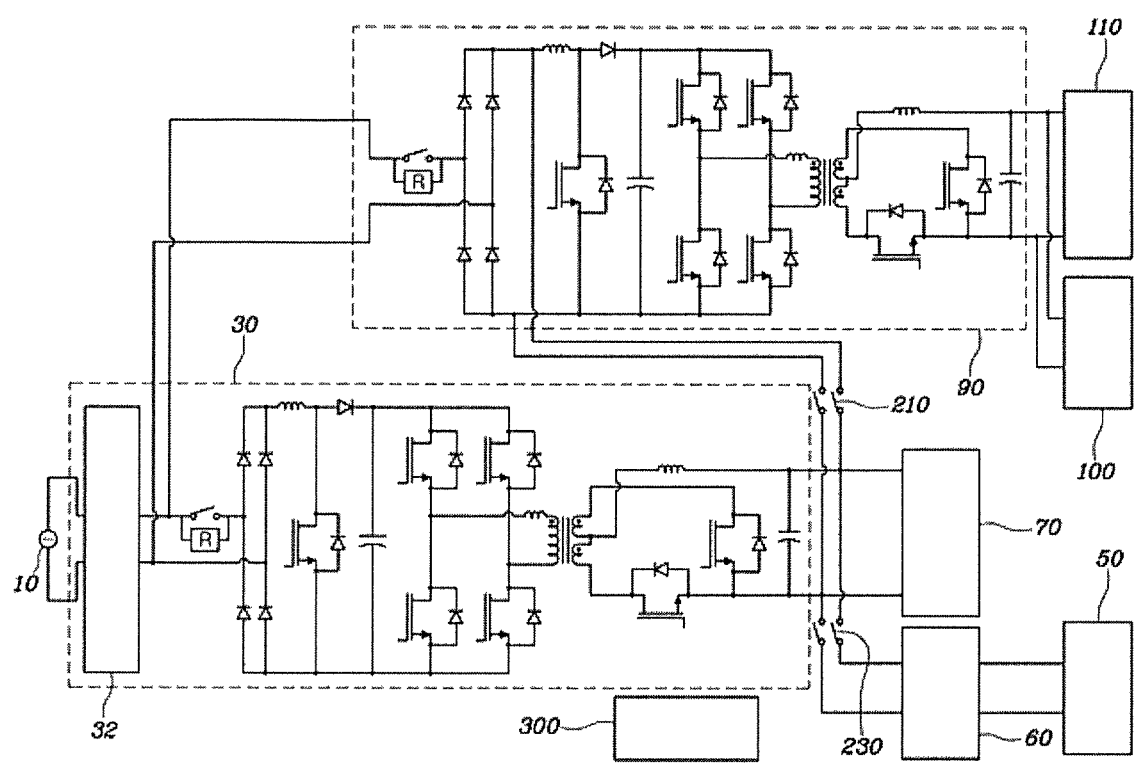
FIGS. 8 to 10 are circuit diagrams of a vehicle battery charging control system, in which a second charging circuit is connected to a first charging circuit, according to an embodiment of the present invention.
Figure 9:
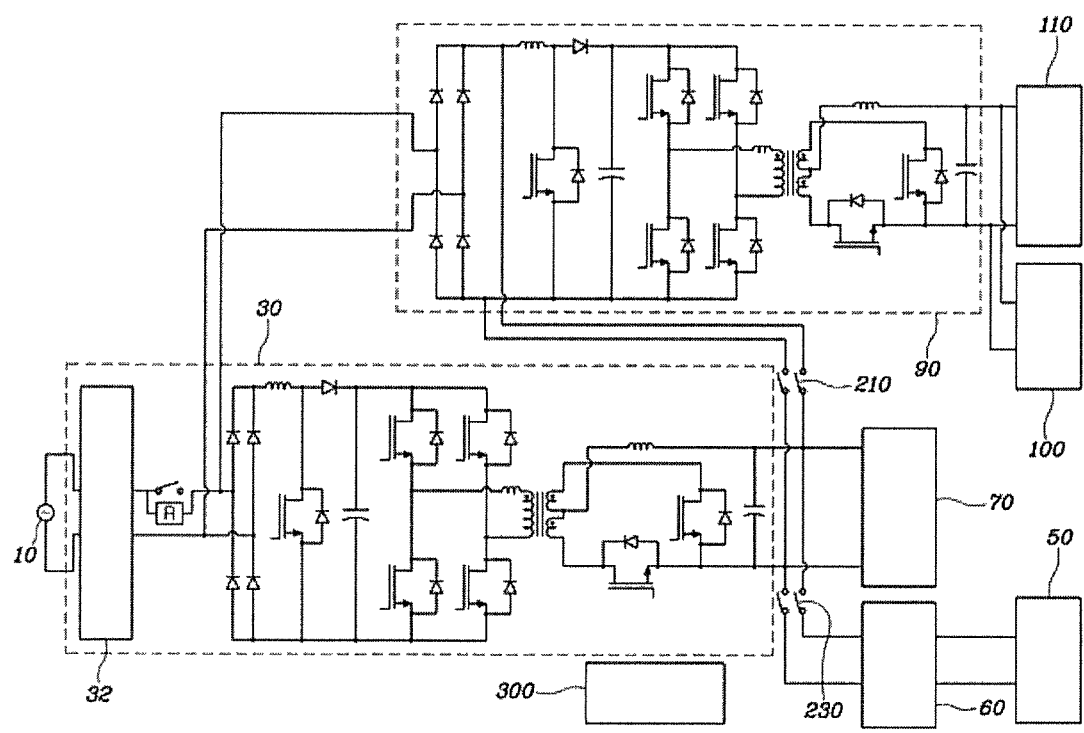
Figure 10:
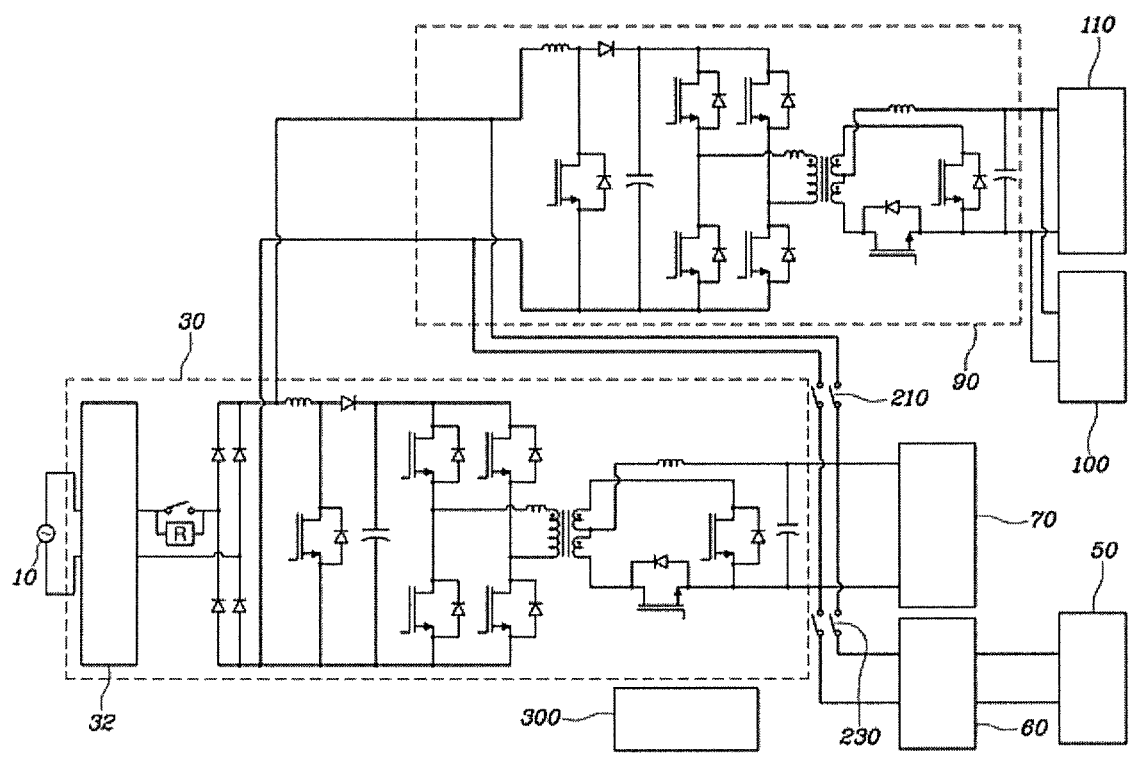

FIG. 1 is a diagram showing the configuration of a vehicle battery charging control system according to an embodiment of the present invention, FIG. 2 is a diagram showing the configuration of a second charging circuit of a vehicle battery charging control system according to an embodiment of the present invention, FIGS. 3 and 4 are circuit diagrams showing a vehicle battery charging control system according to an embodiment of the present invention, FIG. 5 is a diagram showing the configuration of a vehicle battery charging control system further including a second switching unit according to an embodiment of the present invention, FIG. 6 is a diagram showing the configuration of a vehicle battery charging control system, in which a second charging circuit is connected to a first charging circuit, according to an embodiment of the present invention, FIG. 7 is a diagram showing the configuration of a first charging circuit of a vehicle battery charging control system according to an embodiment of the present invention, and FIGS. 8 to 10 are circuit diagrams of a vehicle battery charging control system, in which a second charging circuit is connected to a first charging circuit, according to an embodiment of the present invention.

First, referring to FIGS. 1 and 2, the vehicle battery charging control system according to the embodiment of the present invention may include a first charging circuit 30 configured to convert an AC voltage received from an external AC power source 10 into a DC voltage and to output the DC voltage; a high-voltage battery 70 configured to receive the DC voltage from the first charging circuit 30 and to store energy delivered from the first charging circuit 30; a second charging circuit 90 configured to convert the AC voltage received from the external AC power source 10 into a DC voltage and to output the DC voltage and including a DC-DC conversion circuit 94 configured to output a DC voltage; a low-voltage battery 110 configured to receive the DC voltage output from the second charging circuit 90 and to store energy delivered from the second charging circuit 90; a first switching unit 210 connected between the high-voltage battery 70 and an input terminal of the DC-DC converter 94; and a controller 300 configured to control the state of the first switching unit 210 depending on whether a vehicle travels or whether the vehicle is charged.

Here, the first charging circuit 30 may be an on-board battery charger (OBC) as one embodiment of the present invention and may convert the AC voltage received from the external AC power source 10 into the DC voltage to charge the high-voltage battery 70.

In one embodiment of the present invention, the second charging circuit 90 may include a power factor corrector (PFC) 92 configured to convert the AC voltage received from the external AC power source 10 into the DC voltage and including a rectifier and a boost converter, and the DC-DC conversion circuit 94 configured to drop the DC voltage output from the PFC 92 and to output a DC voltage. The DC-DC conversion circuit 94 may convert the AC voltage received from the external AC power source 10 into the DC voltage to charge a low-voltage battery 110 or to supply the voltage to an electric device 100. The DC-DC conversion circuit 94 may be a low-voltage DC-DC converter in one embodiment of the present invention.

The controller 300 may control the state of the first switching unit 210 depending on whether the vehicle travels or whether the vehicle is charged. Referring to FIG. 3, the controller 300 closes the first switching unit 210 when the vehicle travels. Referring to FIG. 4, when the vehicle is charged, the controller 300 opens the first switching unit 210.

Here, when the vehicle travels, the first switching unit 210 is closed and the second charging circuit 90 may receive power from the high-voltage battery 70 to supply power to the electric device 100 and the low-voltage battery 110. When the vehicle connected to the external AC power source 10 is charged, the first switching unit 210 is opened and the second charging circuit 90 does not receive power from the high-voltage battery 70 but converts the AC voltage received from the external AC power source 10 into the DC voltage through the FPC 92 and drops the DC voltage through the DC-DC conversion circuit 94 to supply the power to the electric device 100 and the low-voltage battery 110. Therefore, upon charging, the second charging circuit 90 including the DC-DC conversion circuit 94 (LDC) may prevent power delivery efficiency of the first charging circuit 30 (OBC) from being reduced, thereby improving the fuel efficiency of the vehicle.

In one embodiment of the present invention, one side of the first switching unit 210 may be connected to the high-voltage battery 70 and the other side thereof may be connected to an input terminal of the boost converter of the PFC 92.

Here, the other side of the first switching unit 210 may be connected to the input terminal of the boost converter of the PFC 92, thereby reducing loss generated upon voltage drop to improve efficiency.

Referring to FIG. 5, the vehicle battery charging control system according to the embodiment of the present invention may further include a second switching unit 220 connected between the external AC power source 10 and the input terminal of the second charging circuit 90. The controller 300 may close the first switching unit 210 and open the second switching unit 220, when the vehicle travels. The controller 300 may open the first switching unit 210 and close the second switching unit 220, when the vehicle is charged. The vehicle battery charging control system according to the embodiment of the present invention may further include an inverter 60 connected between the high-voltage battery 70 and a driving unit 50 to convert the DC voltage received from the high-voltage battery 70 into an AC voltage and to output the AC voltage; and a third switching unit 230 connected between the high-voltage battery 70 and the inverter 60. The controller 30 may open the first switching unit 210 and the third switching unit 230 and close the second switching unit 220, when the vehicle is charged. The controller 30 may close the first switching unit 210 and the third switching unit 230 and open the second switching unit 220, when the vehicle travels.

Referring to FIGS. 6 and 7, the vehicle battery charging control system according to the embodiment of the present invention may include a first charging circuit 30 including a filter 32 configured to eliminate noise of an external AC power source 10, a power factor corrector (PFC) 36 configured to convert an AC voltage received from the external AC power source 10 into a DC voltage and to output the DC voltage, a relay 34 connected between the filter 32 and the PFC 36 and a DC-DC conversion circuit 38 configured to boost the DC voltage output from the PFC 36 and to output the DC voltage; a high-voltage battery 70 configured to receive the DC voltage output from the first charging circuit 30 and to store energy delivered from the first charging circuit 30; a second charging circuit 90 configured to convert the AC voltage from the external DC power source 10 into a DC voltage and to output the DC voltage, including a DC-DC conversion circuit 94 configured to output the DC voltage, and connected to the first charging circuit 30 and the high-voltage battery 70; a low-voltage battery 110 configured to receive the DC voltage output from the second charging circuit 90 and to store energy delivered from the second charging circuit 90; a first switching unit 210 connected between the high-voltage battery 70 and an input terminal of the DC-DC conversion circuit 94; and a controller 300 configured to close the first switching unit 210 when the vehicle travels and to open the first switching unit 210 when the vehicle is charged.

Referring to FIG. 8, the second charging circuit 90 of the vehicle battery charging control system according to the embodiment of the present invention may include a PFC 92 configured to convert the AC voltage received from the external AC power source 10 into the DC voltage and to output the DC voltage, the DC-DC conversion circuit 94 may drop the DC voltage output from the PFC 92 and output the DC voltage, and the input terminal of the second charging circuit 90 may be connected between the filter 32 and the relay 34 of the first charging circuit 30. To this end, the input terminal of the second charging circuit 90 may be connected between the filter 32 and the relay 34 of the first charging circuit 30, and the second charging circuit 90 shares the EMI filter 32 of the first charging circuit 30, thereby achieving structural simplification.

Referring to FIG. 9, the second charging circuit 90 of the vehicle battery charging control system according to the embodiment of the present invention may include a PFC 92 configured to convert the AC voltage received from the external AC power source 10 into the DC voltage and to output the DC voltage, the DC-DC conversion circuit 94 may drop the DC voltage output from the PFC 92 and output the DC voltage, and the input terminal of the second charging circuit 90 may be connected between the relay 24 of the first charging circuit 30 and the input terminal of the PFC 36. To this end, the input terminal of the second charging circuit 90 may be connected between the relay 34 of the first charging circuit 30 and the input terminal of the PFC 36 to share the EMI filter 32 and the relay 34, thereby achieving structural simplification.

Referring to FIG. 10, the PFC 36 of the first charging circuit 30 of the vehicle battery charging control system according to the embodiment of the present invention may include a rectifier and a boost converter, and the input terminal of the second charging circuit 90 may be connected between the rectifier of the first charging circuit 30 and the input terminal of the boost converter. To this end, the input terminal of the second charging circuit 90 may be connected between the rectifier of the first charging circuit 30 and the input terminal of the boost converter to share the EMI filter 32, the relay 34 and the rectifier, thereby achieving structural simplification.

Although not shown in the figure, in FIGS. 8 to 10, the vehicle charging control system according to the embodiment of the present invention may further include a second switching unit 220 connected between the first charging circuit 30 and an input terminal of the second charging circuit 90, and the controller 300 may close the first switching unit 210 and open the second switching unit 220 when the vehicle travels and open the first switching unit 210 and close the second switching unit 220 when the vehicle is charged.

As described above, the vehicle charging control systems according to the various embodiments of the present invention may not connect the LDC to the high-voltage battery but may connect the LDC to the AC power source to prevent power delivery efficiency of the OBC from being reduced. Therefore, it is possible to increase efficiency of power delivered to the electric device and the low-voltage battery to improve fuel efficiency.

In addition, even when the same input power is required, power delivery efficiency may increase upon slow charging, thereby shortening a charging time and reducing electricity costs.

In addition, since an EMI filter, a relay and a rectifier are shared, it is possible to achieve structural simplification.

Although the exemplary embodiments of the present invention have been disclosed for illustrative purposes, those skilled in the art will appreciate that various modifications, additions and substitutions are possible, without departing from the scope and spirit of the invention as disclosed in the accompanying claims.

What is claimed is:

1. A vehicle battery charging control system comprising:
a first charging circuit configured to convert an alternating current (AC) voltage received from an external AC power source into a direct current (DC) voltage and to output the DC voltage;
a high-voltage battery configured to receive the DC voltage output from the first charging circuit and to store energy delivered from the first charging circuit;
a second charging circuit configured to convert the AC voltage received from the external AC power source into a DC voltage and to output the DC voltage and including a DC-DC conversion circuit configured to output the DC voltage;
a low-voltage battery configured to receive the DC voltage output from the second charging circuit and to store energy delivered from the second charging circuit;
a first switching unit connected between the high-voltage battery and an input terminal of the DC-DC conversion circuit of the second charging circuit; and
a controller configured to control a state of the first switching unit depending on whether a vehicle travels or whether the vehicle is charged,
wherein the second charging circuit further includes a power factor corrector (PFC) configured to convert the AC voltage received from the external AC power source into a DC voltage and to output the DC voltage, the PFC including a rectifier and a boost converter,
wherein the DC-DC conversion circuit of the second charging circuit drops the DC voltage output from the PFC and outputs a DC voltage, and
wherein one side of the first switching unit is connected to the high-voltage battery and another side of the first switching unit is connected to an input terminal of the boost converter of the PFC.

2. The vehicle battery charging control system according to claim 1, wherein the controller closes the first switching unit when the vehicle travels.

3. The vehicle battery charging control system according to claim 1, wherein the controller opens the first switching unit when the vehicle is charged.

4. The vehicle battery charging control system according to claim 1, further comprising a second switching unit connected between the external AC power source and the second charging circuit,
wherein the controller closes the first switching unit and opens the second switching unit when the vehicle travels.

5. The vehicle battery charging control system according to claim 4, wherein the controller opens the first switching unit and closes the second switches when the vehicle is charged.

6. A vehicle battery charging control system comprising:
a first charging circuit including a filter configured to eliminate noise of an external alternating current (AC) power source, a power factor corrector (PFC) configured to convert an AC voltage received from the external AC power source into a direct current (DC) voltage and to output the DC voltage, a relay connected between the filter and the PFC, and a DC-DC conversion circuit configured to boost the DC voltage output from the PFC and to output a DC voltage;
a high-voltage battery configured to receive the DC voltage output from the first charging circuit and to store energy delivered from the first charging circuit;
a second charging circuit configured to convert the AC voltage received from the external AC power source into a DC voltage and to output the DC voltage, including a DC-DC conversion circuit configured to output a DC voltage, and connected to the first charging circuit and the high-voltage battery;
a low-voltage battery configured to receive the DC voltage output from the second charging circuit and to store energy delivered from the second charging circuit;
a first switching unit connected between the high-voltage battery and an input terminal of the DC-DC conversion circuit of the second charging circuit; and
a controller configured to close the first switching unit when a vehicle travels and to open the first switching unit when the vehicle is charged,
wherein the second charging circuit further includes a power factor corrector (PFC) configured to convert the AC voltage received from the external AC power source into a DC voltage and to output the DC voltage, the PFC including a rectifier and a boost converter, wherein the DC-DC conversion circuit of the second charging circuit drops the DC voltage output from the PFC of the second charging circuit and outputs a DC voltage, and wherein one side of the first switching unit is connected to the high-voltage battery and another side of the first switching unit is connected to an input terminal of the boost converter of the PFC.

7. The vehicle battery charging control system according to claim 6, wherein the second charging circuit includes a power factor corrector (PFC) configured to convert the AC voltage received from the external AC power source into a DC voltage and to output the DC voltage, and the DC-DC conversion circuit of the second charging circuit drops the DC voltage output from the PFC of the second charging circuit and outputs a DC voltage, and an input terminal of the second charging circuit is connected between the filter and the relay of the first charging circuit.

8. The vehicle battery charging control system according to claim 6, wherein the second charging circuit includes a power factor corrector (PFC) configured to convert the AC voltage received from the external AC power source into a DC voltage and to output the DC voltage, and the DC-DC conversion circuit of the second charging circuit drops the DC voltage output from the PFC of the second charging circuit and outputs a DC voltage, and an input terminal of the second charging circuit is connected between the relay of the first charging circuit and an input terminal of the PFC.

9. The vehicle battery charging control system according to claim 6, wherein the PFC of the first charging circuit includes a rectifier and a boost converter, and wherein an input terminal of the second charging circuit is connected between the rectifier of the first charging circuit and an input terminal of the boost converter.

10. The vehicle battery charging control system according to claim 6, further comprising a second switching unit connected between the first charging circuit and an input terminal of the second charging circuit, wherein the controller closes the first switching unit and opens the second switching unit when the vehicle travels and opens the first switching unit and closes the second switching unit when the vehicle is charged.

* * * * *